United States Patent [19]

Horvath

[11] 4,034,780
[45] July 12, 1977

[54] CHECK VALVE

[75] Inventor: Tibor Horvath, Brooklyn, N.Y.

[73] Assignee: Aquology Corporation, Newark, N.J.

[21] Appl. No.: 709,807

[22] Filed: July 29, 1976

Related U.S. Application Data

[63] Continuation-in-part of Ser. No. 652,232, Jan. 26, 1976, abandoned.

[51] Int. Cl.² .................. F16K 15/03; F04F 10/00
[52] U.S. Cl. .................. 137/527.8; 137/146; 137/151; 137/527
[58] Field of Search ............ 137/151, 527, 527.2, 137/527.4, 527.6, 527.8, 146

[56] References Cited

U.S. PATENT DOCUMENTS

| 364,206 | 10/1887 | Baltzley | 137/527.8 |
|---|---|---|---|
| 385,292 | 6/1888 | Baltzley | 137/527.8 X |
| 1,000,719 | 8/1911 | Cram | 137/527 X |
| 1,653,929 | 12/1927 | Reed | 137/527.8 X |
| 1,926,759 | 9/1933 | Wallman | 137/527.8 X |
| 3,391,645 | 7/1968 | Koza | 137/527 X |
| 3,815,629 | 6/1974 | Oberholtzer | 137/527.8 |

*Primary Examiner*—Alan Cohan
*Assistant Examiner*—Gerald A. Michalsky
*Attorney, Agent, or Firm*—Peter L. Tailer

[57] ABSTRACT

A check valve for use in a tube has a closure element hinged in the tube which nests within one side of the tube in the open position and pivots to substantially block the tube in the closed position. The closure element has a bottom edge and an upward extending edge which intersect at 90 degrees at the diameter of the closure element, the edges meeting the side of the closure element at points disposed one above the other a distance apart greater than the diameter of the tube. A tubular seat with upper surfaces conforming to the edges of the closure element in the closed position may be inserted below it as a press fit in the tube and the closure element may be hinged to the seat.

1 Claim, 6 Drawing Figures

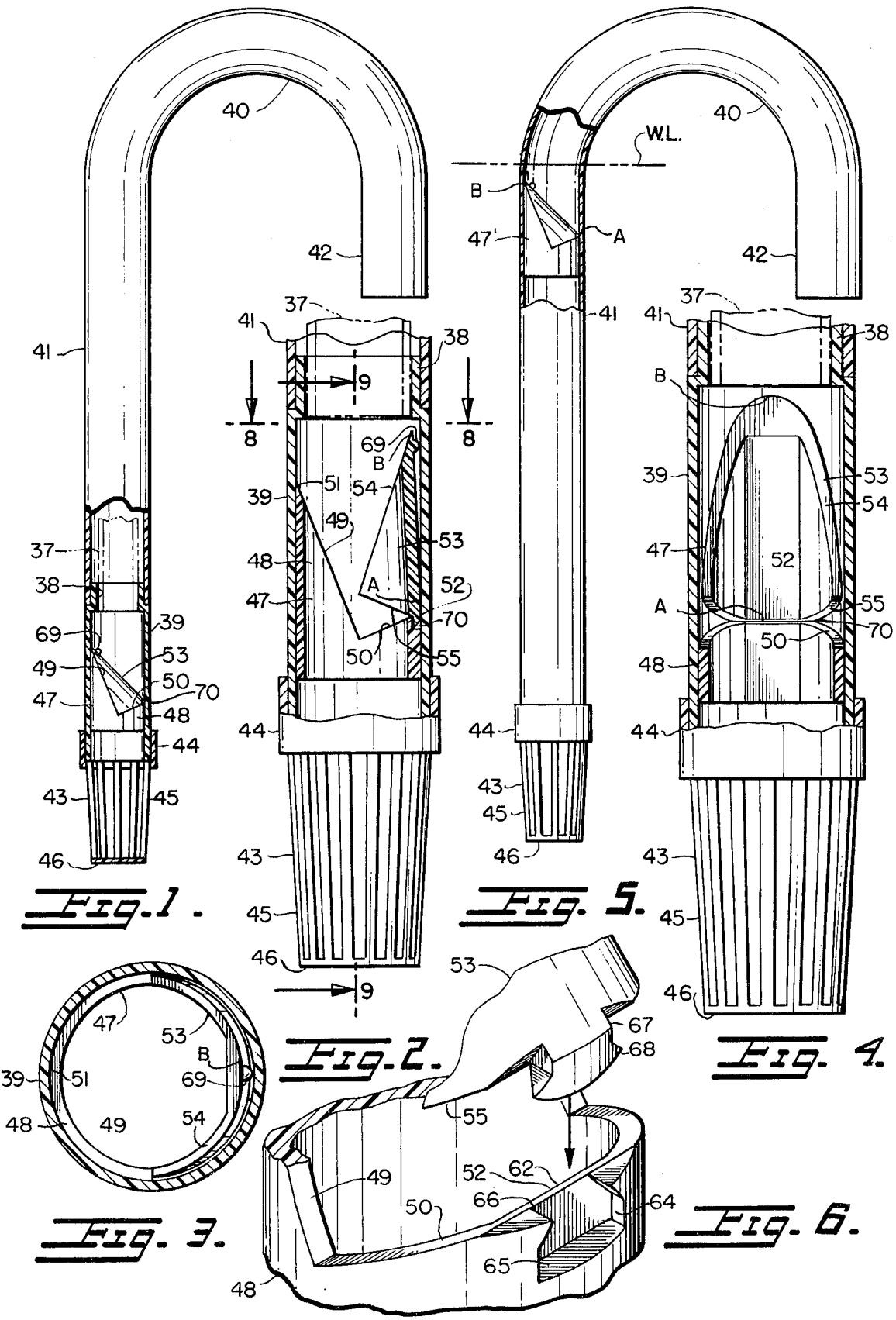

CHECK VALVE

CROSS REFERENCES TO RELATED APPLICATIONS

This application is a continuation-in-part of my patent application Ser. No. 652,232 filed Jan. 26, 1976 and now abandoned.

BACKGROUND OF THE INVENTION:

1. Field of the Invention:

This invention relates to check valves, and, more particularly, to check valves to be inserted in a tube.

2. Description of the Prior Art:

Check valves of many types are old and well known.

SUMMARY OF THE INVENTION:

A check valve for use in a tube has a closure element formed as a portion of a cylindrical wall of a diameter to nest within the tube, said closure element having a bottom edge and an upward extending edge, the edges being in planes intersecting at 90° at the diameter of the cylindrical wall, the bottom edge extending to a first point on the side of the cylindrical wall and the upward extending edge extending to a second point on the cylindrical wall above the first point, the first point being a greater distance from the second point that the diameter of the tube. The closure element is hinged to the tube at the first point so that it swings from an open position nesting against one side of the tube to a closed position substantially blocking the tube. A valve seat may be provided as a tubular insert press fit within the tube, the insert having plane upward facing surfaces to contact and conform to the edges of the closure in its closed position. The closure element may be hinged to the seat so that the entire check valve may be pressed in place in a tube.

The check valve of this invention offers less resistance to flow in the open position, it seals completely in the closed position, it is inexpensve to manufacture, and it is particularly easy to install in any tube. It is particularly effective in a self-starting siphon.

BRIEF DESCRIPTION OF THE DRAWING

FIG. 1 is a side view of a self-starting siphon partially broken away in vertical section to show a check valve accordihg to this invention, the check valve being in the closed position;

FIG. 2 is an enlarged vertical section through a broken away portion of the siphon of FIG. 1 showing the check valve in the open position;

FIG. 3 is a secion taken on line 8—8 of FIG. 2;

FIG. 4 is a section taken on line 9—9 of FIG. 2;

FIG. 5 is a side view of a self-starting siphon partially broken away in section to show the check valve of this invention inserted therein; and FIG. 6 is a perspective view of a fragment of a tubular seat and a fragment of a closure element positioned above the seat showing hinge means therebetween.

DESCRIPTION OF THE PREFERRED EMBODIMENT

As shown in FIGS. 1 and 5, the check valve 47 or 47' of this invention can be used in a self-starting aquarium siphon 40 where it is very effective. It has many other applications, particularly in the aquarium field. Siphon 40 has a long suction leg 41 to extend within an aquariun tank (not shown) and a discharge leg 42 which empties into a filter tank (not shown) as is well known in the art. The siphon 40 is started by grasping it and giving it one or more rapid vertical oscillations.

A cylindrical extension 39 of leg 41 has a smaller diameter upper portion 38 which is inserted in leg 41. Portion 38 may alternately receive a smaller diameter suction leg 37 as shown in phantom lines. A strainer 43 has a cylindrical collar 44 into which the bottom of extension tube 39 is fixed with a press fit. Downward and inwardly tapering screen members 45 and bottom member 46 are integrally molded with collar 44.

Check valve 47 has a closure element 53 with a specific geometry. As shown in FIG. 3, the closure element 53 is a cylindrical wall that nests against the inside of tube extension 39 or tube 41. It has a bottom edge 55 and an upward extending edge 54, the edges 55 and 54 being disposed in planes which intersect at 90° at the diameter of closure element 53 and of tube extension 39. Bottom edge 55 extends to a first point A at the side of element 53 and upward extending edge 54 extends to a second point B at the side of element 53, point B being directly above point A and being a greater distance from point A than the diameter of tube 39. Closure element 53 is hinged to tube 39 at point A. The geometry of element 53 is such that, in the open position shown in FIG. 2, it allows almost complete free flow through tube 39, and in the closed position it almost completely blocks flow through tube 39.

The number of degrees element 53 has to pivot from a fully open to a fully closed position is determined by the distance betweem points A and B. If this distance is the same as the diameter of tube 39, it will pivot 90° which is excessive. A maximum of 45° or less is preferable, so the distance between points A and B should be at least 1.41 times greater than the inside diameter of tube extension 39.

While not required for substantial closure of tube 39, a tubular seat 48 may be provided having upward facing first and second surfaces 49 and 50 which correspond to the edges 54 and 55 of closure element 53 in its closed position. Seat 48 may be pressed in place in tubes 39 or 41 and serve to hinge closure element 53 to the tube 39 or 41 at point A.

Referring to FIG. 6, the wall of tubular seat 48 has a thickened porion 62 at its uppermost portion 52 to accommodate an opening 64 extending into its outer surface and having an enlarged lower portion 65 with a smaller upper entrance 66. Closure element 53 has an extension 67 with an enlarged end 68. When end 68 is placed in opening 64, it forms a hinge connection 70 between closure element 53 and seat 48.

Since the hinge structure incorporating opening 64 is disposed towards the outer surface of seat 48, surface 50 of seat 48 is covered without a break by surface 55 of closure 53 in the closed position to completely block the flow of water therepast. A projection 69 of closure element 53 prevents it from completely opening against tube 39 so that outflow of water from suction leg 41 will close it.

If the intersection of surfaces 49 and 50 and edges 55 and 54 form an angle substantially less than 90°, hinge connection 70 will not allow the closure element 53 to open. If the intersection of surfaces 49 and 50 and the edges 55 and 54 form an angle substantially more than 90°, closure element 53 at the intersection of its edges will have to be deformed or flattened as the intersection will move appreciably away from the diameter of tube 39.

While the check valve of this invention is shown in a self-starting siphon where it is particularly effective, it may be used in many other applications.

I claim:

1. A check valve for use in a tube, said check valve comprising, in combination, a closure element formed as a portion of a cylindrical wall to nest within said tube, said closure element having a bottom edge and an upward extending edge, said edges being in planes intersecting at 90° at substantially the diameter of the cylindrical wall, said bottom edge extending to the side of said cylindrical wall to a first point, said upward extending edge extending to the side of said cylindrical wall to a second point above said first point, said second point being a greater distance from said first point than 1.41 times the inside diameter of said tube, a projection of said closure at said second point contacting said tube preventing the complete opening of said closure element, a tubular seat fixed in said tube having upwardly facing surfaces contacting the edges of said closure in the closed position, and a downward extension of said closure element from said first point, said extension having an enlarged end, said seat on its outer-surface containing an opening with an enlarged lower portion and a smaller upper entrance, said enlarged end of said extension extending into said opening and interlocking therewith forming a hinge connection, said surface of said seat conforming to the bottom edge of said closure element extending in front of said opening, said bottom edge of said closure element extending in front of said extension making unbroken contact with said seat in the closed position, so that said closure element nests against said tube in an open position and is swung by downward flow to a closed position completely blocking said tube.

* * * * *